May 21, 1957 B. G. COPPING 2,792,695
POWER TRANSMISSION DEVICES
Filed Nov. 12, 1953 2 Sheets-Sheet 1
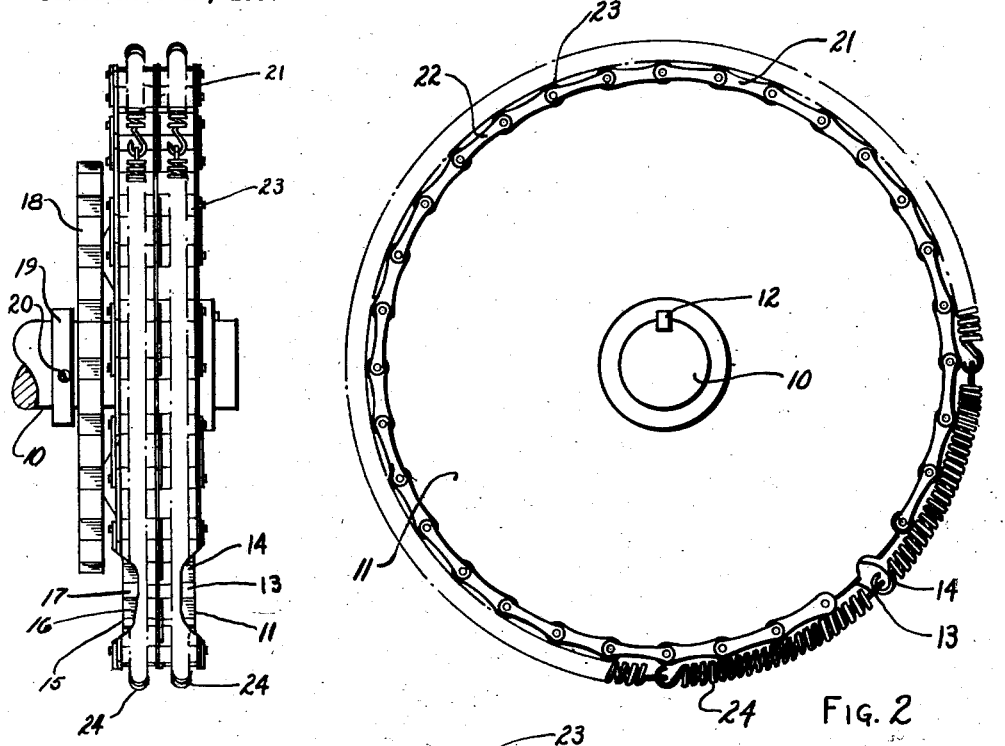
Fig. 1
Fig. 2
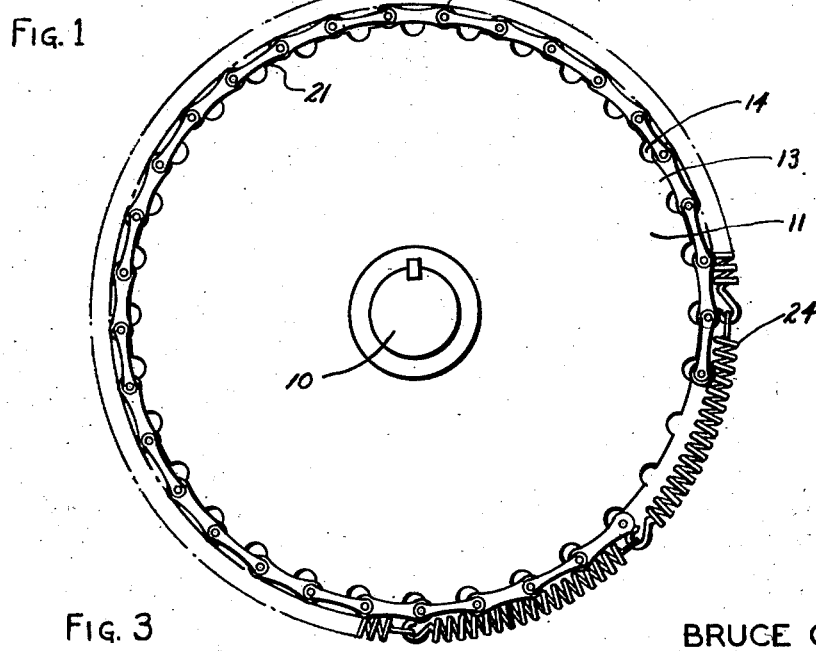
Fig. 3
INVENTOR
BRUCE G. COPPING
BY
William F. Swezey
ATTORNEY May 21, 1957 B. G. COPPING 2,792,695
POWER TRANSMISSION DEVICES Filed Nov. 12, 1953 2 Sheets-Sheet 2

INVENTOR
BRUCE G. COPPING
BY
*William J. Swezey*
ATTORNEY

United States Patent Office 2,792,695
Patented May 21, 1957

2,792,695

POWER TRANSMISSION DEVICES

Bruce G. Copping, Akron, Ohio, assignor to Atkron, Inc., Cuyahoga Falls, Ohio, a corporation of Ohio Application November 12, 1953, Serial No. 391,574

2 Claims. (Cl. 64—29)

This invention relates to power transmission mechanisms and particularly to rotary mechanisms of the type wherein driving and driven members are coupled together in such a manner that an overload on the driven member will cause the coupling between the driving and driven members to become disengaged automatically until the condition which causes the overload is relieved. Such a coupling prevents damage to the source of power for the driving member and also prevents damage to the mechanism operated by the driven member.

Among the devices heretofore proposed for this purpose are friction couplings. Such couplings are apt to slip under less than overload conditions and thus do not transmit the full driving torque available under less than overload conditions.

It has also been proposed to use devices having an interconnecting member between the driving and driven members, in which one portion of the interconnecting member is permanently connected to the driving member while another portion thereof positively and mechanically engages the driven member or something permanently connected thereto, until an overload condition on the driven member is reached, whereupon the mechanical connection with the driven member is broken to relieve the driving member of the load. In such mechanisms it is common practice to have the interconnecting member so constructed that it must be reset manually, a condition which requires an attendant for the machine. Also, with such mechanism, the driven machine is inactive and performs no useful function until the interconnecting has been reset.

It has also been proposed to provide mechanisms as described in the preceding paragraph, in which the interconnection is automatically restored when the overload is relieved. One such mechanism proposed has a portion of the interconnecting member attached to the driving member, with a releasable connection to the driven member made by a roller of a link chain portion which engages a recess in a disc attached to the driven member.

Positive drive interconnecting members of this class have the disadvantage that they usually have only a single point of connection with the driven member of the assembly with the result that, for a given size they transmit only a limited amount of the available driving torque, and if they are designed to transmit the required torque by a multiple connection, they become bulky, complicated and unduly expensive.

According to the present invention an overload responsive clutch is provided which has an interconnection between the driving and driven members so constructed as to have very high torque transmission capacity for a given size; which instantly release the driven member in the event of overload; which automatically resets itself when the overload condition is rectified; which has few parts; which is not bulky and which may be made cheaply of readily available materials.

Fundamentally, the present invention comprises a pair of toothed discs identical in diameter, pitch and tooth form. One disc is attached to the driving member and the other to the driven member. The interconnection between the two discs comprises a double width roller chain of standard design. Its pitch is the same as that of the teeth of the two discs. However, instead of being continuous, at least one link of the chain is omitted. More than one link may be omitted but each link so omitted reduces the torque transmission.

The action of the teeth of the driving disc on each roller of the chain and the reaction of the teeth on the driven disc against each roller, creates a mechanical couple which results in a force tending to move each roller outwardly from engagement with the teeth of the discs. The roller chain is prevented from so moving by spring means which exert enough force inwardly and axially to oppose movement of the rollers outwardly until a predetermined maximum outward force is reached. This outward force, which is determined by the spring resistance, determines the load at which the connection between the driving and driven discs becomes ineffective to transmit torque to the driven member. In other words, when an overload condition on the driven member is reached, the spring means yields and allows the rollers to move out of the recesses on the periphery of the discs. When this happens, the driving member is relieved of its load and this condition prevails until the overload has been relieved whereupon the rollers slip back automatically into driving engagement with the recesses on the discs.

In the drawings two embodiments of the invention are shown, the difference between the two being in the nature of the spring means.

In the drawings:

Fig. 1 is a vertical side elevation of an overload clutch mechanism embodying the invention, a portion being broken away for clarity.

Fig. 2 is a vertical front elevation of the mechanism shown in Fig. 1 with the interconnecting member in driving position.

Fig. 3 is a view similar to Fig. 2 but showing the interconnecting mechanism in released position.

Figures 4, 5:
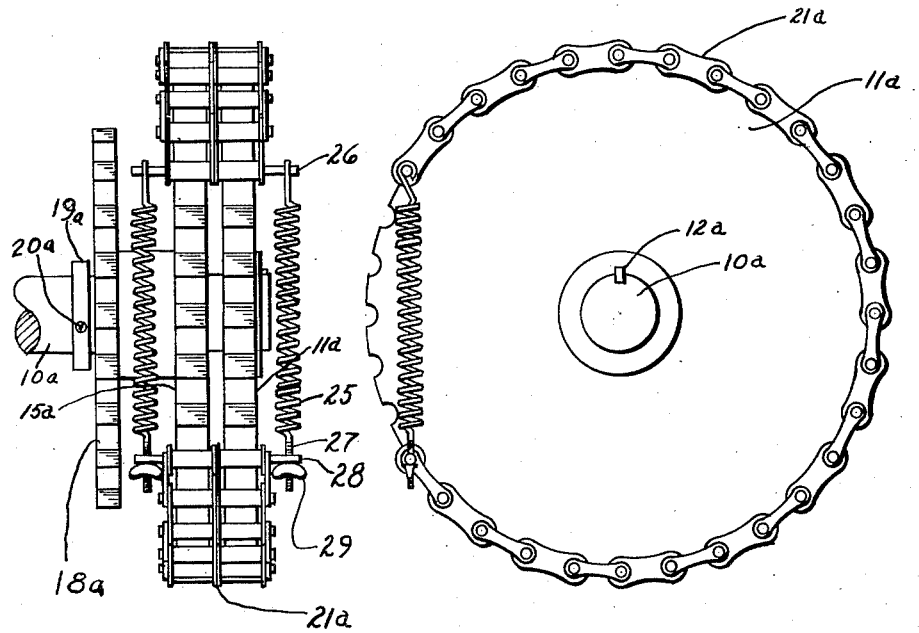
Fig. 4 is a vertical side elevation of another form of the invention.
Fig. 5 is a vertical front elevation of the embodiment of Fig. 4 with the interconnecting mechanism in driving position.

Referring to the drawings and particularly to the embodiment shown in Figs. 1 and 3, there is indicated a driving shaft 10 having a disc 11 attached thereto as by a key 12. Disc 11 is provided at its periphery with a plurality of equally spaced teeth 13 which extend around the entire periphery of the disc. A relatively shallow recess 14 lies between each pair of teeth 13. The depth of the recess is not particularly critical but it should not be so deep that the rollers to be hereafter described will not readily release therefrom.

A disc 15 identical in diameter with disc 11 is also provided. Disc 15 has a tooth construction about its periphery identical with that of disc 11, the teeth on disc 15 being indicated at 16 and the recesses between the teeth being indicated at 17. Disc 15, however, is freely rotatable on shaft 10 and comprises the driven member of the clutch assembly. For the purpose of illustrating the invention, disc 15 is here shown as connected to a gear wheel 18, the wheel 18 also being freely rotatable on shaft 10. A collar 19 attached to the shaft 10 by means of a set screw 20 serves to prevent lateral motion of the disc 15 and gear wheel 18 on the shaft 10. It will be understood that the showing of a gear wheel driven by disc 15 is illustrative only and that this disc may be suitably connected to any part to be driven.

The means for interconnecting the driving disc 11 and driven disc 15 comprises a double width roller chain 21. This chain, which is of the conventional link belt type, comprises a series of links 22 pivotally connected together adjacent the link ends by the usual rollers 23 between adjacent links. This double width chain is disposed around the peripheries of discs 11 and 15. However, the chain is not continuous. Instead, it will be noted (Fig. 2) that at least one link is omitted for a purpose to be hereafter described. The rollers 23 engage in the recesses 14 and 16 of discs 11 and 15 respectively. Preferably the recesses between the teeth on each disc are relatively shallow. However, they may be made deeper to increase torque transmission.

In the embodiment of Figs. 1 to 3 the chain is held in engagement with the recesses by a pair of continuous band or garter springs 24 which are identical in construction. Each of these springs serves to force the rollers on the chain into engagement with the recesses on the disc it surrounds. The function of the springs is to provide a force counter to that created by the chain when the rollers connect the driving and driven discs through the teeth 13 and 17 tend to move by centrifugal force out of the recesses 14 and 16 as the driving disc 11 is rotated through shaft 10 from a source of power (not shown).

The normal tendency of rollers 23 is to ride upwardly and outwardly from the teeth. This is counteracted by the force of the springs which serve to maintain the rollers in engagement with the teeth until the outward force against the springs, which is created by an overload on the driven disc, is sufficient to overcome the force of the springs. When this condition arises the rollers become disengaged from the teeth (Fig. 3) and the disc 11 rotates freely as it is then uncoupled from the driven disc 15. When the overload condition has been rectified the rollers again engage the teeth on the discs and the driving relation between the discs is resumed automatically.

While I have shown only one link omitted from the chain (to make it non-continuous) it is possible for the device to operate with more than one link omitted. However each link so omitted reduces the torque transmitted between the driving and driven discs.

It will be apparent from the foregoing description that the point of release is determined by the counter-force exerted by the springs against the rollers 23 when the latter are in motion and that by changing springs the amount of overload at which the device operates can be controlled.

The embodiment shown in Figs. 4 and 5 is identical in function and structure with that shown in Figs. 1 to 3 except that instead of a pair of continuous band springs to provide a counterforce, I provide an adjustable spring connection between the open ends of the roller chain. In this embodiment like parts are designated by like numbers with the addition of the letter "a". Thus the disc 11a is fixed to drive shaft 10a by a key 12a, while the driven disc 15a is mounted for free rotation on shaft 10a. The double width roller chain 21a does not completely encircle discs 11a and 15a. The open ends of the chain are connected by an adjustable spring mechanism here shown as a pair of coiled tension springs 25, one end of each of which is connected to an ear 26 extending laterally from the side of one end of the chain, the other end being connected to a bolt 27 passing through an ear 28 extending laterally from the side of the opposite end of the chain. A wing nut 29 is provided on each bolt so that the tension on each spring can be adjusted.

In this embodiment the driven gear wheel 18a is maintained on shaft 10a by a collar 19a and a set screw 20a.

A particular feature of the invention, as distinguished from prior art constructions, is that each roller transmits driving torque simultaneously thus giving maximum torque transmission in normal operation.

It is believed that the operation of the device is readily apparent from the foregoing description.

While the invention has been shown in only two embodiments it will be apparent that the scope of the invention is limited only by the following claims.

I claim:

1. In a power transmission mechanism comprising a completely automatic clutch releasing and resetting mechanism, the combination of a primary circular rotatable member, a secondary circular rotatable member, said members being of equal diameter and disposed on a common axis in parallel planes closely adjacent each other, each of said members being provided on its periphery with a plurality of equally spaced recesses, means comprising a discontinuous chain having links joined by spaced transverse rollers disposed adjacent the ends of each link of the chain for transmitting driving torque from the primary to the secondary member, said chain and rollers being wide enough to extend across the peripheries of both said members so that each roller may transmit driving torque from the primary to the secondary member with the rollers normally in engagement with said recesses, said chain being free of permanent connection with the primary or secondary members and connection means yieldable on an overload condition on the secondary rotatable member for permitting release of the aforesaid rollers from said recesses to prevent the transmission of driving torque between the primary and secondary rotatable members, said yielding means having no permanent connection with either the primary or secondary rotatable member, said yieldable means comprising continuous spring means surrounding said discontinuous chain and exerting enough inward force to restore automatically said rollers in said recesses when the overload condition on the secondary rotatable member is relieved.

2. In a power transmission mechanism comprising a completely automatic clutch releasing and resetting mechanism, the combination of a primary circular rotatable member, a secondary circular rotatable member, said members being of equal diameter and disposed on a common axis in parallel planes closely adjacent each other, each of said members being provided on its periphery with a plurality of equally spaced recesses, means comprising discontinuous chain having links joined by spaced transverse rollers disposed adjacent the ends of each link of the chain for transmitting driving torque from the primary to the secondary member, said chain and rollers being wide enough to extend across the peripheries of both said members so that each roller may transmit driving torque from the primary to the secondary members and connection means between the chain ends which shall be yieldable on an overload condition on the secondary rotatable member for permitting release of the aforesaid rollers from said recesses to prevent the transmission of driving torque between the primary and secondary rotatable members, said yielding means having no permanent connection with either the primary or secondary rotatable member, said yieldable means including a spring means at least in part surrounding said discontinuous chain and exerting enough inward force to restore automatically said rollers in said recesses when the overload condition on the secondary rotatable member is relieved.

References Cited in the file of this patent

UNITED STATES PATENTS

| 1,805,692 | Ferenci | May 19, 1931 |
| 2,519,848 | Osterdahl | Aug. 22, 1950 |

FOREIGN PATENTS

| 603,914 | France | Jan. 14, 1926 |